United States Patent
Mattern

(10) Patent No.: US 9,984,517 B2
(45) Date of Patent: May 29, 2018

(54) SYSTEM AND METHOD FOR DETERMINING ENTRY TO A SECURED AREA AT A CHECKPOINT

(71) Applicant: Iberon, LLC, Houston, TX (US)

(72) Inventor: Jeremy Keith Mattern, Austin, TX (US)

(73) Assignee: Jeremy Keith Mattern, Austin, TX (US)

( * ) Notice: Subject to any disclaimer, the term of this patent is extended or adjusted under 35 U.S.C. 154(b) by 10 days.

(21) Appl. No.: 14/924,748

(22) Filed: Oct. 28, 2015

(65) Prior Publication Data

US 2017/0124791 A1   May 4, 2017

(51) Int. Cl.
| | |
|---|---|
| *G07C 9/00* | (2006.01) |
| *G06F 17/30* | (2006.01) |
| *G06F 21/33* | (2013.01) |
| *G06F 21/34* | (2013.01) |

(52) U.S. Cl.
CPC ... *G07C 9/00142* (2013.01); *G06F 17/30867* (2013.01); *G06F 21/33* (2013.01); *G07C 9/00031* (2013.01); *G07C 9/00103* (2013.01); *G06F 21/34* (2013.01)

(58) Field of Classification Search
CPC .......... G06F 21/32; G06F 21/34; G06F 21/00; G06F 21/33; G06F 17/30867; G07C 9/00; G07C 9/0031; G07C 9/00103; G07C 9/00031; G07C 9/00142; G06Q 10/10; G06Q 50/265

USPC ........................... 340/5.8, 5.54, 5.81
See application file for complete search history.

(56) References Cited

U.S. PATENT DOCUMENTS

| | | | |
|---|---|---|---|
| 7,970,912 B2* | 6/2011 | Bourne | H04L 51/32 455/414.1 |
| 2014/0009260 A1* | 1/2014 | Mattern | G06F 21/32 340/5.8 |
| 2014/0009265 A1* | 1/2014 | Mattern | G06F 21/00 340/5.81 |
| 2014/0012636 A1* | 1/2014 | Mattern | G06Q 10/10 705/13 |
| 2014/0012770 A1* | 1/2014 | Mattern | G06Q 10/10 705/325 |

* cited by examiner

*Primary Examiner* — Ali Neyzari
(74) *Attorney, Agent, or Firm* — Derek V. Forinash; Porter Hedges LLP

(57) ABSTRACT

A system and method for determining entry to a secured area at a checkpoint, wherein the method can comprise the steps of receiving by an Access Control Operations Center (ACOC) server from a checkpoint computer a request for entry and identification data, and requesting one or more records from one or more public records databases. The method can also comprise receiving by the ACOC server the records from the one or more public record databases, and performing a keyword search on the one or more records using one or more predetermined keywords to find hits on the one or more predetermined keywords. Moreover, the method can comprise excluding false hits from the hits. Furthermore, the method can comprise sending by the ACOC server to the checkpoint computer a directive to deny the request for entry if any of the hits remain after excluding the false hits.

14 Claims, 17 Drawing Sheets

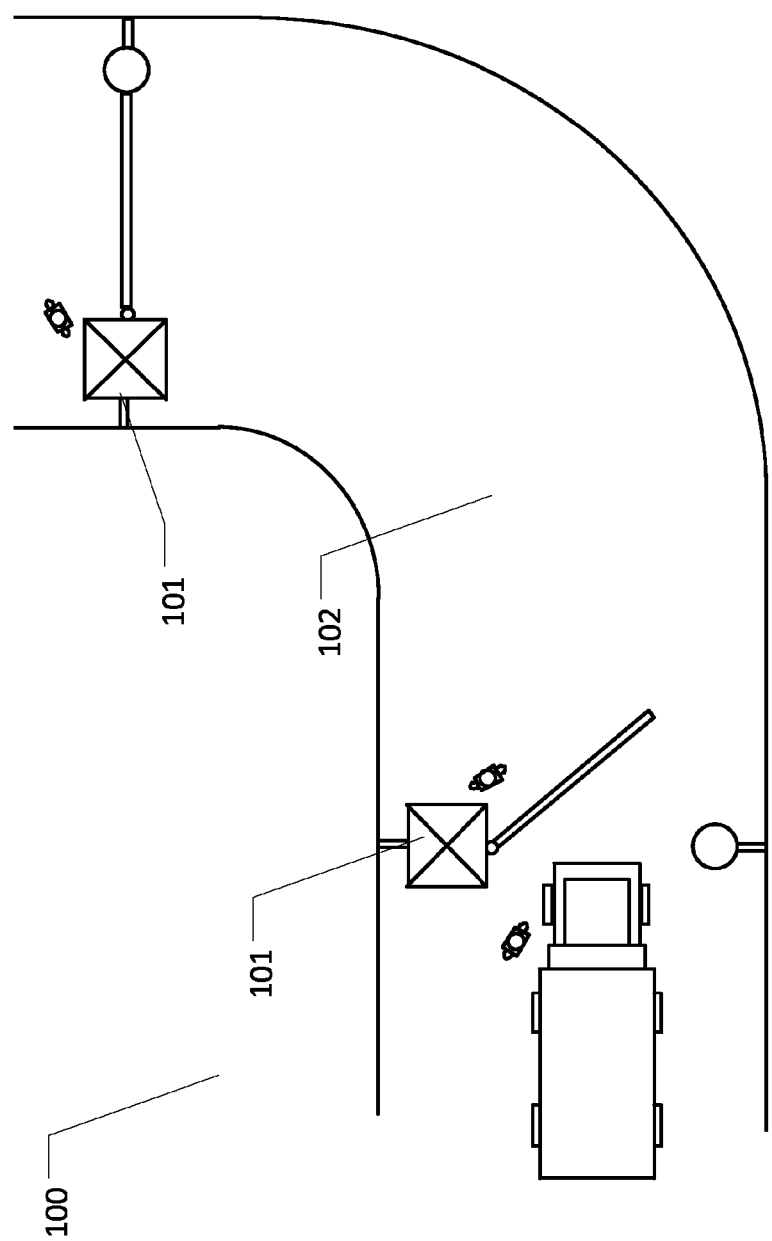

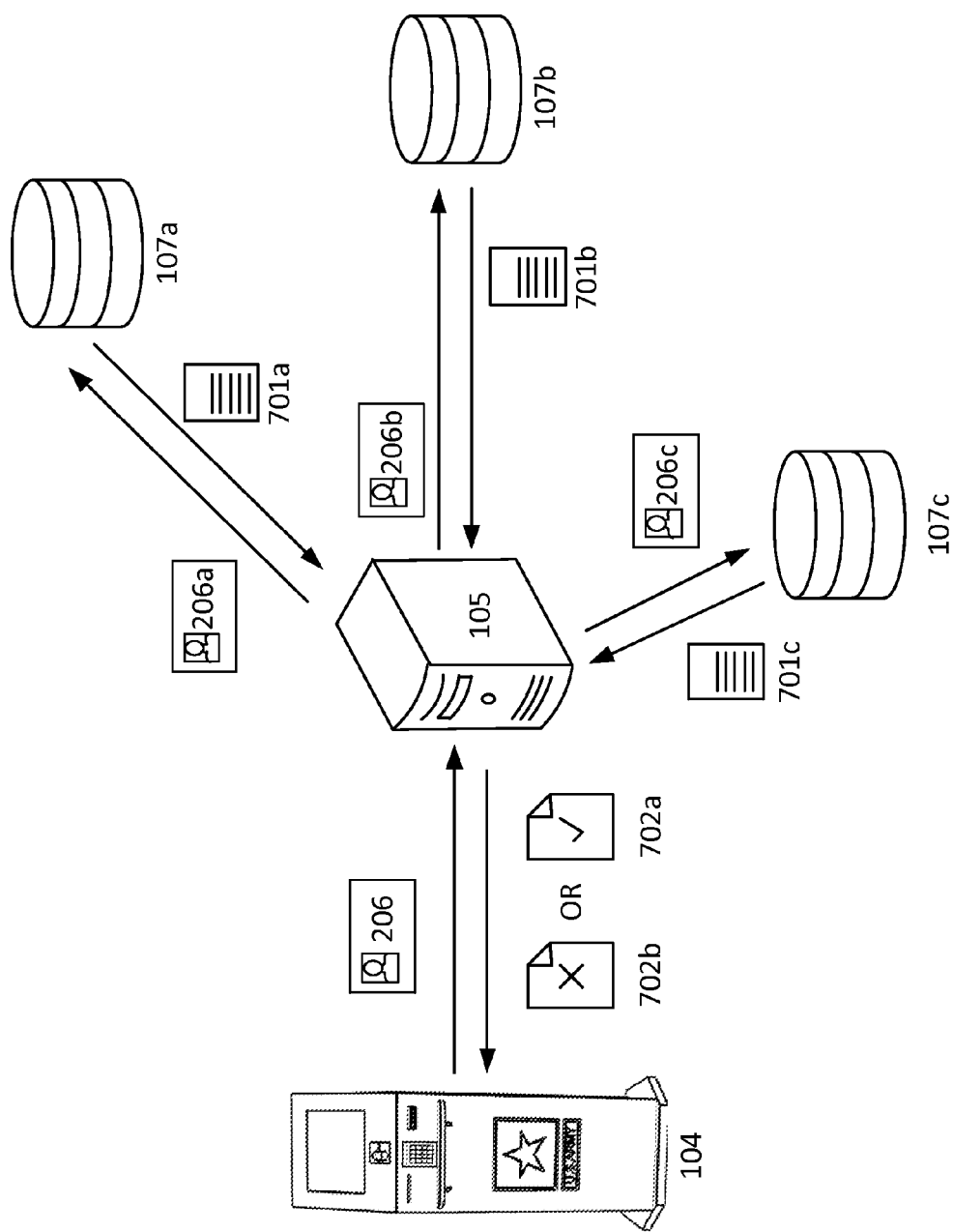

Hintson, Nokio

506a

ID Photo

506b

Kiosk Photo

```
***********************
*     Felony**Record    *
***********************
```
702

ALIASES
HINTSON, NOKIO         SSN        OLS/OLN       ID THEFT
HINTSON, NOKIO A       431234509                NO
                       431234509                NO

SUMMARY
DATE          AGENCY                              TEXT
10/10/2003    ORLEANS, LA CRIMINAL SO             ARRESTED
07/12/2004    LA-DOC P&P ADULT SERVICES           ARRESTED
07/12/2004    LA-DOC P&P ADULT SERVICES           ARRESTED
07/28/2004    LA-DOC P&P ADULT SERVICES
05/02/2011    BOSSIER, LA SO                      DCID, DOC INMATE TRANSFERRED FOM HUNT

ARREST DATE: 10/10/2003
AGENCY: ORLEANS, LA CRIMINAL SO (LA0360000)                    LID: 345698P
  NAME: HINTSON, NOKIO                                         CCH ATN: 20012316
CHARGE 1 ─── 801
  R.S. 14:64 ARMED ROBBERY                                     COUNTS 1

ARREST DATE: 07/12/2004
AGENCY: LA-DOC P&P ADULT SERVICES (LA017035C)                  LID: 316870
  NAME: HINTSON, NOKIO                                         CCH ATN: 30123436
CHARGE 1
  R.S. 14:64 F ARMED ROBBERY                                   COUNTS 1
    STATUTE MODIFIER: 14:27 ATTEMPTED
    DISPOSITION: 020 YR 00 MO 00 DS

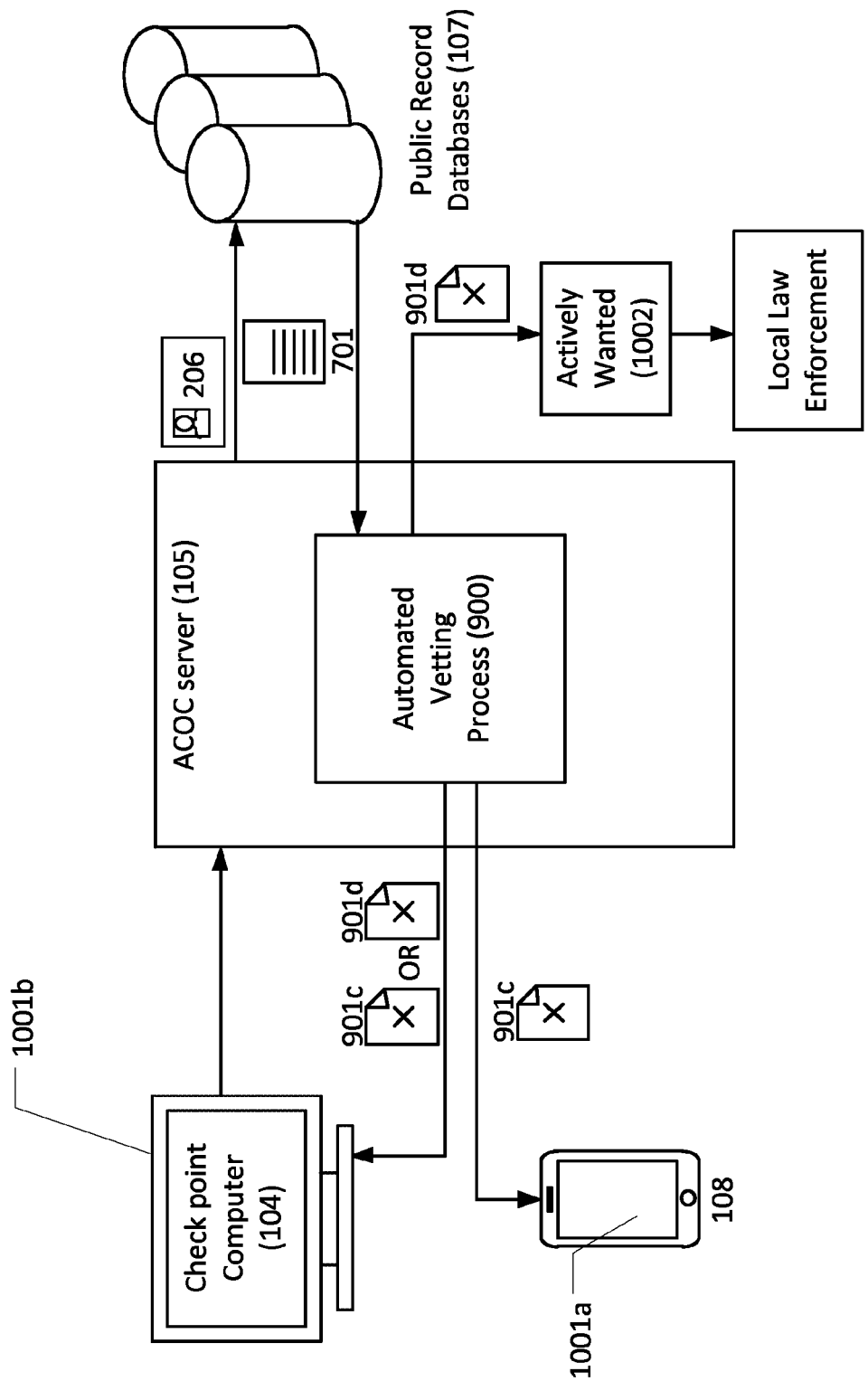

Fig. 12

Hintson, Nokio — 1200

701

Felony Record

A L I A S E S
HINTSON, NOKIO
HINTSON, NOKIO A

S U M M A R Y
| DATE | AGENCY | SSN | OLS/OLN | ID THEFT |
|---|---|---|---|---|
| 10/10/2003 | ORLEANS, LA CRIMINAL SO | 431234509 | TEXT ARRESTED | |
| 07/12/2004 | LA-DOC P&P ADULT SERVICES | 431234509 | ARRESTED | NO |
| 07/12/2004 | LA-DOC P&P ADULT SERVICES | | ARRESTED | NO |
| 05/02/2011 | BOSSIER, LA SO | | DCID, DOC INMATE TRANSFERRED FOM HUNT | |

ARREST DATE: 10/10/2003  LID: 345698P
AGENCY: ORLEANS, LA CRIMINAL SO (LA0360000)  CCH ATN: 20012316
NAME: HINTSON, NOKIO
CHARGE 1  R.S. 14:64 ARMED ROBBERY — 801  COUNTS 1

ARREST DATE: 07/12/2004  LID: 316870
AGENCY: LA-DOC P&P ADULT SERVICES (LA017035C)  CCH ATN: 30123436
NAME: HINTSON, NOKIO
CHARGE 1  R.S. 14:64 F ARMED ROBBERY  COUNTS 1
STATUTE MODIFIER: 14:27 ATTEMPTED
DISPOSITION: 020 YR 00 MO 00 DS

506a — ID Photo
506b — Kiosk Photo

1201 — Approve    1202 — Deny    1203 — Call Police    1204 — Call Subject

SYSTEM AND METHOD FOR DETERMINING ENTRY TO A SECURED AREA AT A CHECKPOINT

BACKGROUND

This disclosure relates to a system and method for determining entry to a secured area at a checkpoint.

Tight security is a top priority when accessing any military installations and/or facilities. Every person entering military installation is subjected to a background check before being granted access to the premises. The background check can be done to ensure that the entrant is cleared from criminal records, or if the entrant is actively wanted. Criminal Justice Information System (CJIS) information obtained from various sources that can include but are not limited to Department of Motor Vehicles (DMVs) and Crime Information Systems, can be utilized to vet entrants. There can be four (4) types of possible outcome when vetting: (1) a true hit, (2) a false hit, (3) a true clear, and (4) a false clear. A true hit reading can be given when the individual does not meet the criteria to enter the premises, and that the individual is appropriately identified as such. This can occur when a criminal history such as felony conviction was determined during background check on said individual. A false hit reading can be given on an individual who does not have a criminal history and meets the criteria for entry, but was denied entry. This can occur because the information available to the authorized checkpoint personnel appears as though the individual does not meet the necessary criteria, such as when an individual seeking entry of the premise shares a similar name and date of birth with a person that has a criminal record. A true clear reading can be granted to an individual who does not have any active warrants or previous criminal history, is appropriately identified as such, and is permitted to enter the military installation. Lastly, a false clear reading can be given when the person who is actively wanted or has a significant criminal history was granted an access to the military installation. This occurrences usually result from one of the following, including but not limited to:

- Errors by the court or district attorney when updating Criminal History Record Information (CHRI)
- Errors by the operator when searching results (typos)
- Falsely assuming that a CHRI entry belongs to another individual
- Falsely assuming the Severity of an offense is lower than it actually is (i.e.: assuming an offense is a misdemeanor when it is an actual felony)

The vetting process usually takes some time and is often vulnerable to human (operator's) error. Creation and providing of entrant badge can also add to the waiting time before another individual can be vetted by an authorized checkpoint personnel.

Additionally, each jurisdiction in the U.S. returns a record, including NCIC originated request, according to each State's unique format. Because of the different format, interpreting CJIS information in an automated fashion has been virtually impossible.

As such it would be useful to have an improved system and method for determining entry to a secured area at a checkpoint.

SUMMARY

This disclosure relates to system and method for determining entry to a secured area at a checkpoint. The method can comprise the steps of receiving by an Access Control Operations Center (ACOC) server from a checkpoint computer a request for entry and identification data, and requesting one or more records from one or more public records databases. The request for entry and the identification data can be related to an entrant. The records can be associated with the identification data. The method can also comprise the steps of receiving by the ACOC server the records from the one or more public record databases, and performing a keyword search on the one or more records using one or more predetermined keywords to find hits on the one or more predetermined keywords. Additionally, the step can include excluding false hits from the hits. The false hits can be related to one or more predetermined exclusions. Lastly, the step can include sending by the ACOC server to the checkpoint computer a directive to deny the request for entry if any of the hits remain after excluding the false hits.

The system for determining entry to a secured area at a checkpoint can comprise a memory and a processor. The memory can comprise a server application, and data storage. The data storage can comprise one or more predetermined keywords, and one or more predetermined exclusions. The processor that can according to the server application receives from a checkpoint computer a request for entry and identification data, and requests one or more records from one or more public records databases. The request for entry and the identification data can be related to an entrant. The records can be associated with the identification data. Furthermore, the server application can receive the records from the one or more public record databases, and performs a keyword search on the one or more records using the one or more predetermined keywords to find hits on the one or more predetermined keywords. Additionally, the server application can exclude false hits from the hits. The false hits can be related to one or more predetermined exclusions. Moreover, the server application can send to the checkpoint computer a directive to deny the request for entry if any of the hits remain after excluding the false hits.

Lastly, the system can comprise a non-transient computer readable storage medium having a computer readable program code embodied therein. The computer readable program code can be adapted to be executed to implement the above mentioned method.

BRIEF DESCRIPTION OF THE DRAWINGS

FIG. 1A illustrates an aerial view of an installation.

FIG. 7 illustrates an exemplary method of providing an automated vetting process through an automated installation entry (AIE) networked environment.

FIG. 8B illustrates an embodiment of a record, which was a result from an automated vetting process of ACOC server.

FIG. 10 illustrates an automated vetting process resulting to an automated denial.

FIG. 12 illustrates a review screen during a manual review.

DETAILED DESCRIPTION

Described herein is a system and method for determining entry to a secured area at a checkpoint. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

FIG. 1A illustrates an aerial view of an installation 100 comprising one or more checkpoints 101 strategically placed around secured area 102. Installation 100 can refer to any public or private facilities designed to restrict unauthorized individuals from accessing, such as a military base, and/or a military installation. Secured area 102 can be the area within the border of installation 100. Secured area 102 can be the area protected and restricted by checkpoints 101. Checkpoints 101 can be a structure or an area within installation 100 that functions as an entry point into secured area 102. Vehicles and/or entrants can be subjected to inspections and background check before passing through checkpoints 101. For purposes of this disclosure, the term "entrant" can comprise any person at checkpoints 101 attempting to obtain a pass, permission, or qualification to enter secured area 102.

Figure 1B:
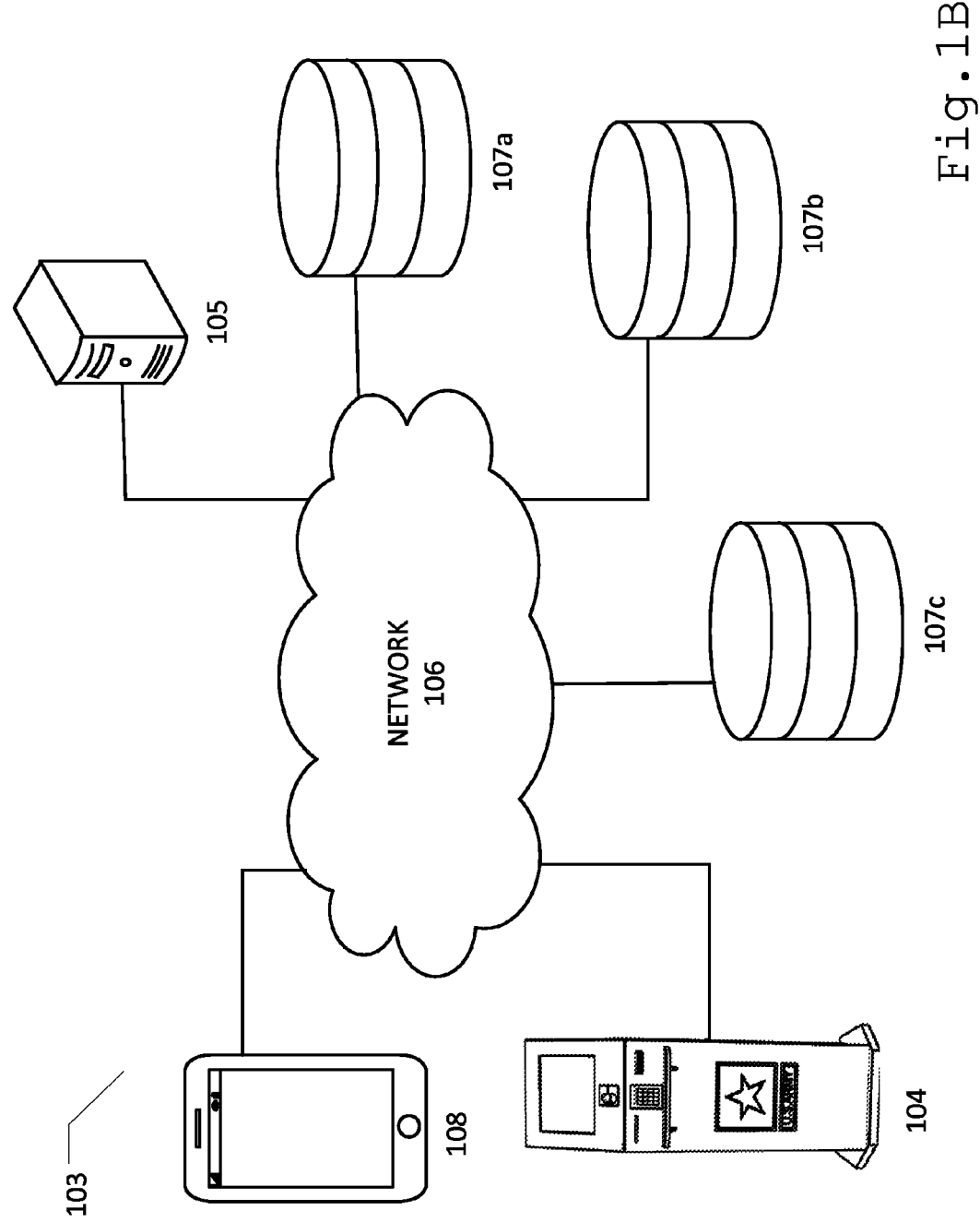
FIG. 1B illustrates an automated installation entry (AIE) networked environment.

FIG. 1B illustrates an automated installation entry (AIE) networked environment 103 comprising a checkpoint computer 104 and an Access Control Operations Center (ACOC) server 105 in communication over network 106. AIE networked environment 103 can additionally interface with one or more public record databases 107 and an entrant device 108 via network 106. AIE environment 103 can be used to reduce error when screening entrants that are trying to access installation 100. AIE environment 103 can be integrated with Criminal Justice Information System (CJIS), as discussed further below. Checkpoint computer 104 can be used at each checkpoint 101. In one embodiment, checkpoint computer 104 can include, but is not limited to, a desktop, a laptop, a tablet, a mobile device, or other similar device. Entrant device 108 can be any mobile and/or handheld device used by an entrant trying to enter installation 100. Entrant device 108 can include, but is not limited to, a tablet, a mobile device, or other similar device. ACOC server 105 can be one or more device capable of performing computational task, and storing data information. ACOC server 105 can provide and perform computational task across network 106. Public record databases 107 can be one or more databases connected on a network 106. Public record databases 107 can store files, and CJIS information from different government office, federal databases, state databases, and/or authoritative databases that can include but is not limited to the Defense Manpower Data Center (DMDC), the state Department of Motor Vehicles (DMVs), National Crime Information System (NCIC). Network 106 can be a wide area network (WAN), or a combination of local area network (LAN), and/or piconets. Network 106 can be hard-wired, wireless, or a combination of both. A LAN can be a network within a single organization while WAN can be the Internet.

Figure 2A:
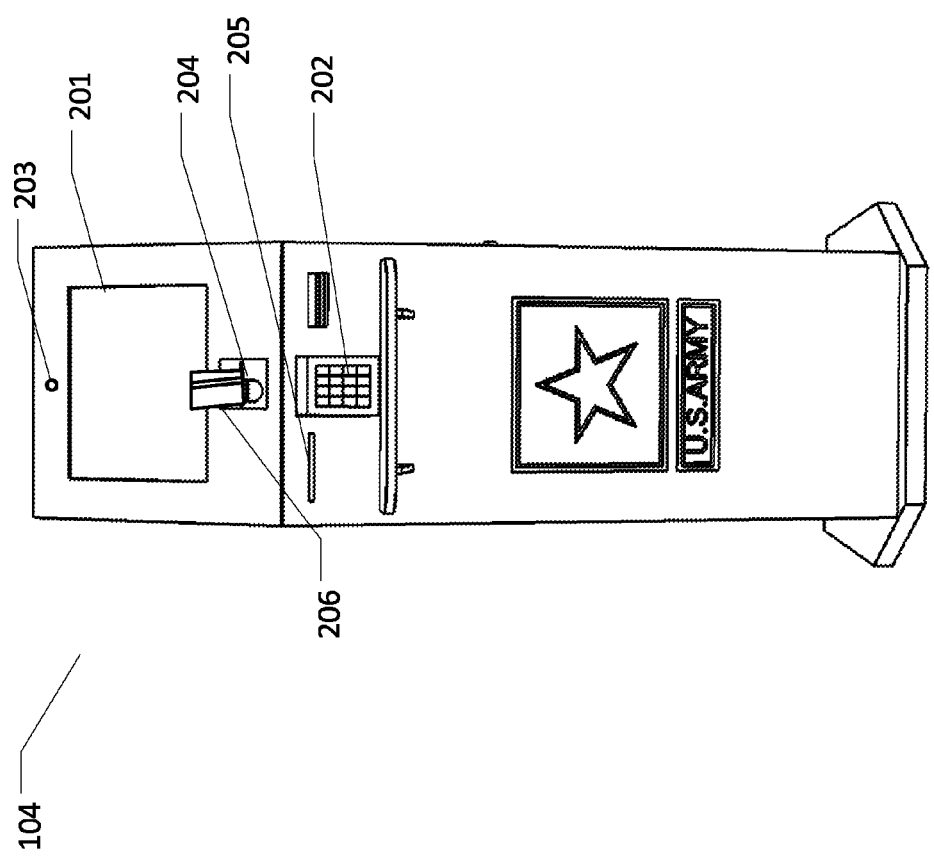
FIG. 2A illustrates an embodiment of a checkpoint computer as a kiosk.

FIG. 2A illustrates an embodiment of checkpoint computer 104 as a kiosk, however checkpoint computer 104 can be any computer including a laptop, desktop, or handheld device. Checkpoint computer 104 can include, but is not limited to, a screen 201, a keypad 202, a camera 203, a card scanner 204, and/or a printer 205. Other input devices can include track balls, joy sticks, or scroll wheels. Screen 201 can be a mere display output, or can also be a touch screen, allowing for capturing of identification data 206. Identification data 206 can include a entrant's name, military rank, serial number and/or unique identification number, grade, military organization, military installation, address, and/or date of birth. Keypad 202 can comprise of a plurality of physical buttons on mobile device, however in an embodiment were screen 201 is a touch screen, keypad 202 can be represented virtually on screen 201. Camera 203 can be used to obtain photographs of a cardholder. Further in an embodiment wherein checkpoint computer 104 can be a kiosk, checkpoint computer 104 can comprise a card slot 207. In one embodiment, card slot 207 can be card scanner 204 that is capable of reading identification data 206 from machine-readable identification cards. Identification data 206 placed on the card can be in a machine-readable form. Such forms can include magnetic strip, barcode or even radio frequency identification (RFID) chip. In one embodiment, card scanner 204 can read a magnetic strip on an identification card. In another embodiment, card scanner 204 can read information encoded in a barcode on an identification card. In another embodiment card scanner 204 comprises a (RFID) chip receiver to read an RFID chip in an identification card. In one embodiment, mobile device can read information encoded in a digital fingerprint scanned from a fingerprint scanner. In another embodiment, card scanner 204 can read an integrated circuit card such as a Smart Card. Further, printer 205 can be a card printer that is capable of printing an access card. In a scenario wherein identification card is not in a machine-readable form or identity of the entrant cannot be verified, the attendant at checkpoints 101 can manually key in identification data 206 using keypad 202 on checkpoint computer 201. The attendant can request for state specific data such as State DMV provided driver's license or identification card photos.

Figure 2B:
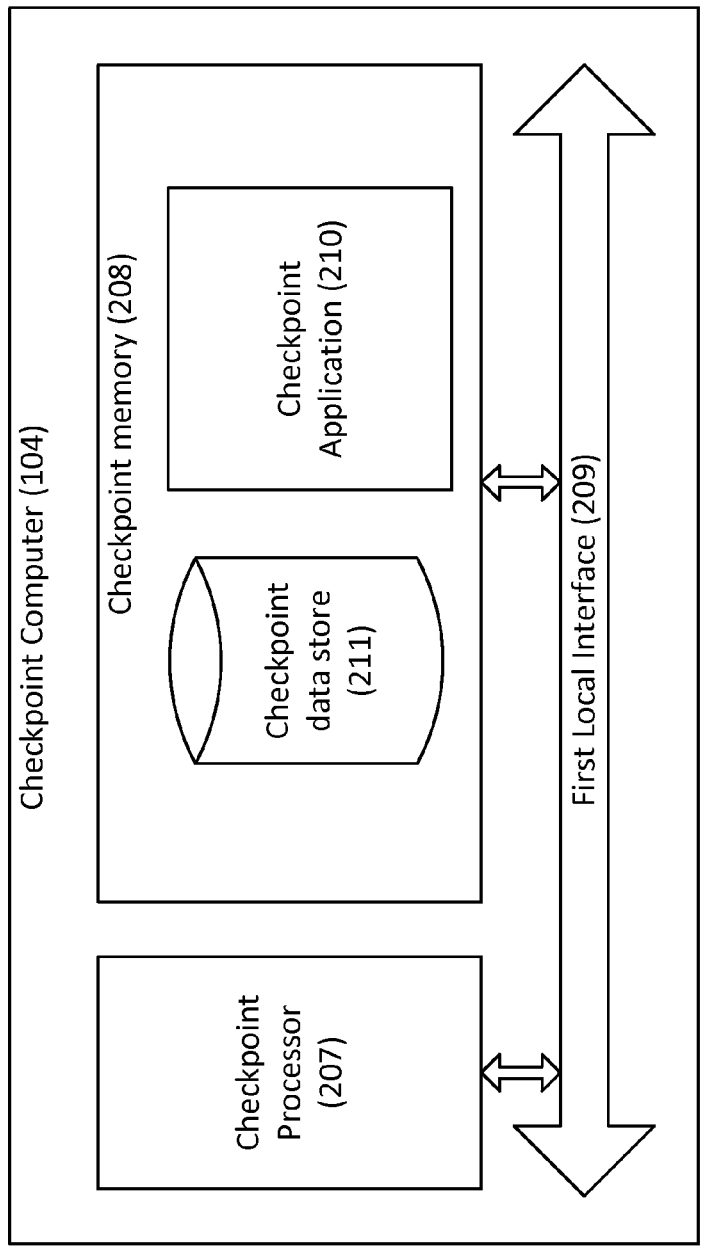
FIG. 2B illustrates a schematic diagram of a checkpoint computer according to an embodiment of the present disclosure.

FIG. 2B illustrates a schematic diagram of checkpoint computer 104 according to an embodiment of the present disclosure. Checkpoint computer 104 can comprise a checkpoint processor 207, and a checkpoint memory 208 and a first local interface 209. First local interface 209 can comprise additional hardware that facilitates communication between internal components, and which can allow user peripherals or network 106 to interact with checkpoint computer 104. As an example, first local interface 209 can comprise, for example, a data bus with an accompanying address/control bus or other bus structure as can be appreciated. Checkpoint processor 207 can be a processing unit that performs sets of instructions stored within checkpoint memory 208. Checkpoint memory 208 can comprise a checkpoint application 210, and a checkpoint data store 211. Checkpoint application 210 can be a program providing logic for checkpoint computer 103. Checkpoint data store 211 can be collections of data accessible by checkpoint application 210. Further, checkpoint application 210 can perform functions such as adding, transferring, and retrieving information on data store 211 using first local interface 209.

Figure 3:
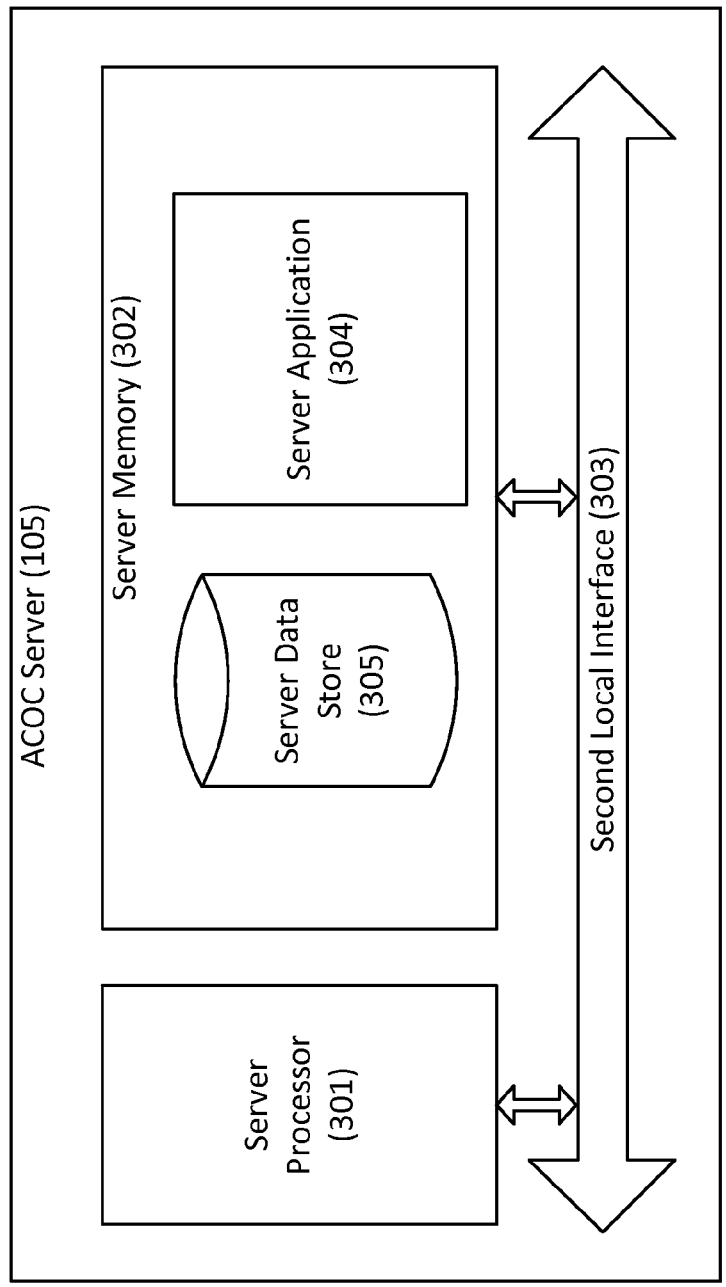
FIG. 3 illustrates a schematic diagram of an Access Control Operations Center (ACOC) server according to an embodiment of the present disclosure.

FIG. 3 illustrates a schematic diagram of an ACOC server 105 according to an embodiment of the present disclosure. ACOC server 105 can comprise a server processor 301, and a server memory 302 and a second local interface 303. Second local interface 303 can comprise additional hardware that facilitates communication between internal components, and which can allow user peripherals or network 106 to interact with ACOC server 105. As an example, second local interface 303 can comprise, for example, a data bus with an accompanying address/control bus or other bus structure as can be appreciated. Second local interface 303 can be a program that controls a display for the user, which can allow user to view and/or interact with ACOC server 105. As an example, second local interface 303 can comprise, for example, a data bus with an accompanying address/control bus or other bus structure as can be appreciated. Server processor 301 can be a processing unit that performs sets of instructions stored within server memory 302. Server memory 302 can comprise a server application 304, and a data store 305. Server application 304 can be a program providing logic for ACOC server 105. ACOC data store 305 can be collections of data accessible through server application 304. Further, server application 304 can perform functions such as adding, transferring, and retrieving information on data store 305 using first local interface 303.

Figure 4:
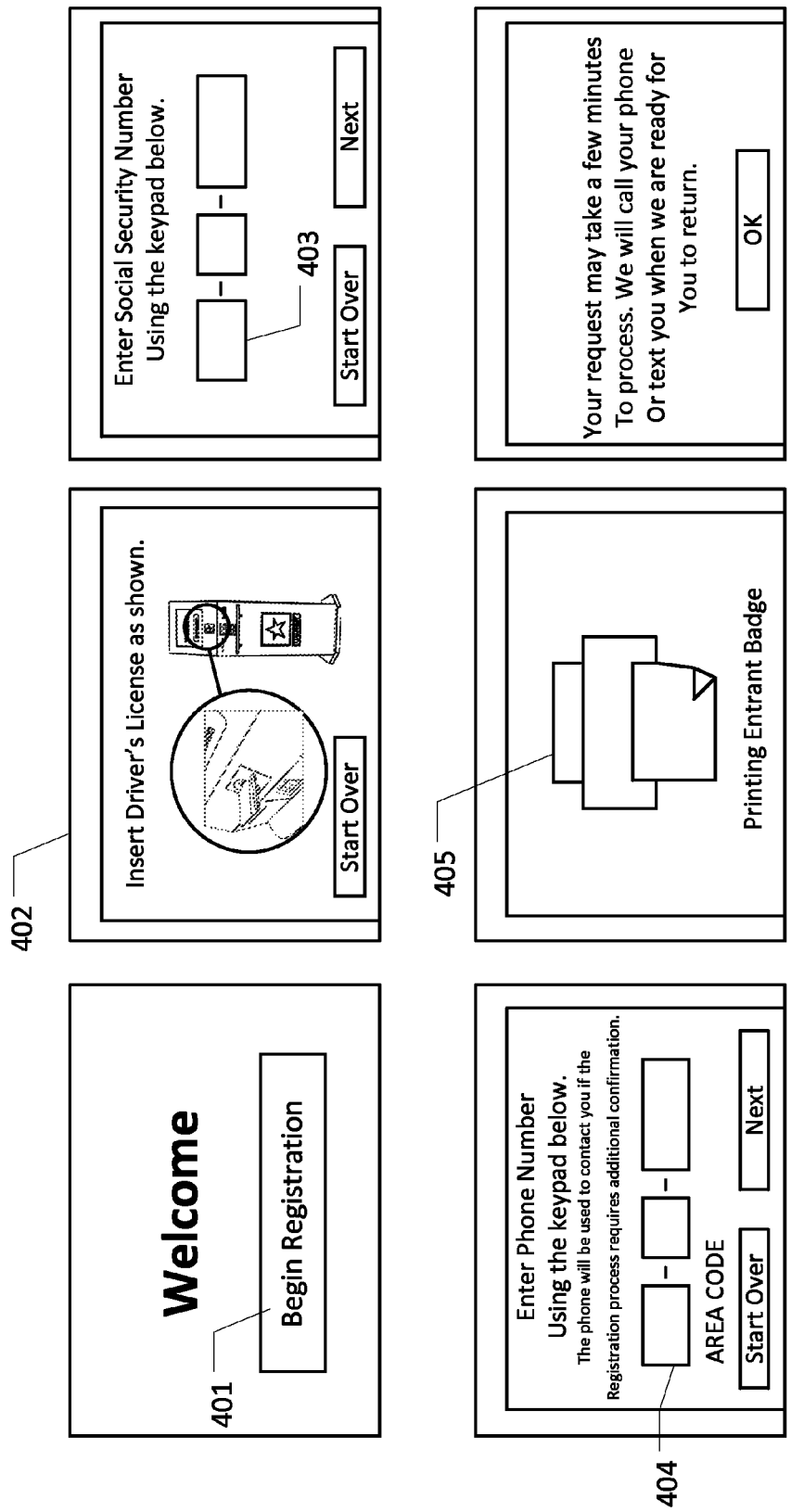
FIG. 4 illustrates an exemplary method for pre-registering on a checkpoint computer.

FIG. 4 illustrates an exemplary method for pre-registering on checkpoint computer 104. In an embodiment wherein checkpoint computer 104 is a kiosk, an entrant can pre-register using checkpoint computer 104 to receive an access on secured area 102. In such embodiment, the entrant needs to access the kiosk and provide identification data 206 required. In an embodiment wherein entrant's identification card is in machine-readable form, the entrant can insert identification card within card slot 207 of checkpoint computer 104. Otherwise, the entrant can manually key-in identification data 206 from identification card, such as an identification number to register on checkpoint computer 104. In another embodiment wherein checkpoint computer 104 can be a mobile device, an attendant can pre-register the entrant for an access on secured area 102. In such embodiment, attendant on checkpoint 101 can key-in identification data 206 of the entrant on checkpoint computer 104.

Initially, an individual such as the entrant or attendant, can click on a begin registration button 401 to begin registering for an entrant badge 405. Checkpoint computer 104 can then instruct the individual through a display 402 to insert a state provided identification document (ID) such as a driver's License. The individual may be required to enter other identification data 206 such as a social security number 403. Concurrently, identification data 206 can be sent to ACOC server 105 and vetting process can be performed. In one scenario, checkpoint computer 104 can inform the individual if request for an entrant is approved. Once approved, the individual can receive entrant badge 405 that can allow an entrant to enter secured area 102. Entrant badge 405 can be printed using printer 207 of checkpoint computer 104. Checkpoint computer 104 can release entrant badge 405 and identification card simultaneously.

However if the individual's request for entrant badge 405 is denied, the individual can be required to enter a mobile number 404 related to entrant device 108. In one embodiment, an entrant badge 405 can be automatically denied and can result to an arrest-on-site. In another embodiment, a further automated review from ACOC server 105 or a manual review from authorized personnel such as a checkpoint attendant can be made. In such embodiment, the entrant can be informed to wait for a call or a text to know whether the entrant's access has been granted or denied. The entrant using entrant device 108, can receive a call, or a text on mobile number 404 that the entrant provided during the registration. Further in another embodiment, an email can be sent to inform the entrant of an adjudication result. Once approved, the entrant can receive a text message or a call on entrant device 108 informing the entrant that the request is approved and that the entrant can reattempt to enter secured area 102. In one embodiment, the call on entrant device 108 can be a pre-recorded message. The entrant can then return to checkpoint computer 104 and re-enter identification card, which can in turn print entrant badge 405.

Further, in some cases wherein public record databases 107 can be experiencing downtime and can be slow to respond, ACOC server 105 can update a vetting record with the delayed identification data 206 once identity information from checkpoint computer 104 is received. In such scenario, the entrant can be initially denied from entry. And an adjudication result can be received once vetting process on ACOC server 105 is completed.

Figure 5:
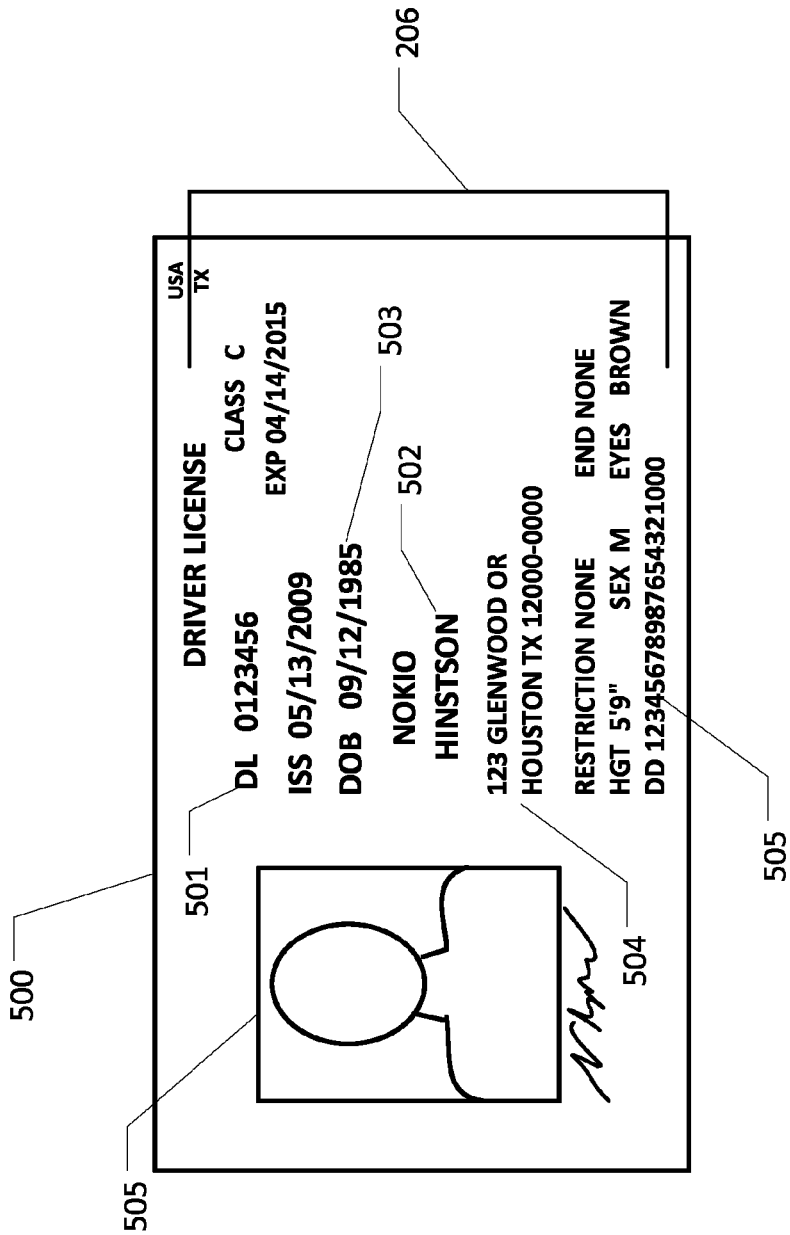
FIG. 5 illustrates an embodiment of an identification card.

FIG. 5 illustrates an embodiment of an identification card 500. Identification card 500 can comprise identification data 206 that can include but is not limited to unique identification number 501, name 502, date of birth 503, address 504, serial number 505, photograph 506, and/or any other information encoded on identification card 500 whether written, magnetically encoded, or encoded by some other method in the art. Identification card 500 can include, but is not limited to, a civilian or military identification card, a passport, a school identification badge or a credit card.

Identification card 500 can further comprise a machine-readable zone 507. Any type of device such as card reader 204 can read machine-readable zone 507. Card reader 204 can be capable of decoding and transcribing identification card information from machine-readable zone 507. Machine-readable zone 507 can be in any form such as a magnetic strip, barcode or RFID chip.

Figure 6:
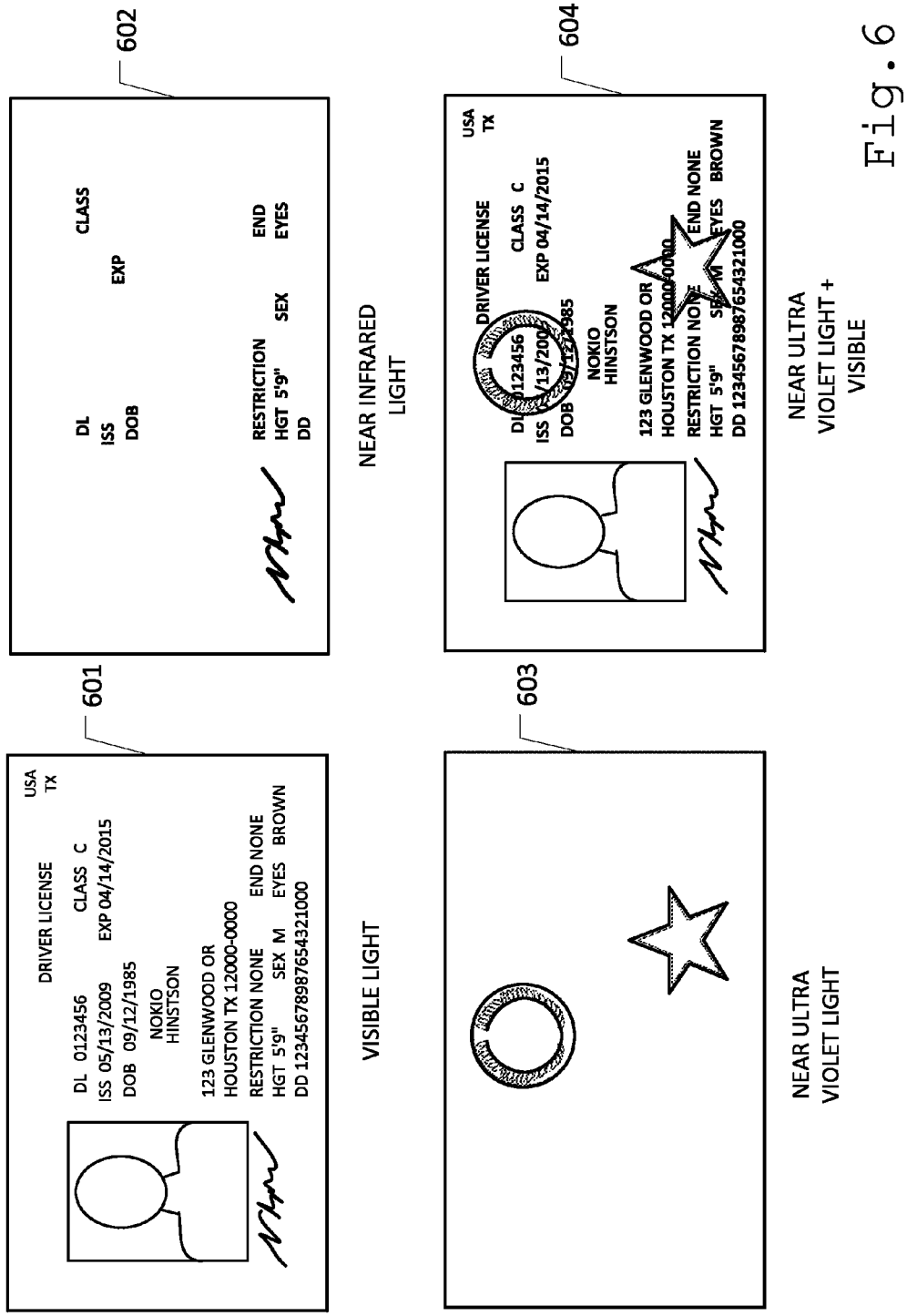
FIG. 6 illustrates a method of digitally authenticating credentials on an identification card.

FIG. 6 illustrates a method of digitally authenticating credentials on identification card 500. In this embodiment identification data 206 can be authenticated using a multiple light method. In a preferred embodiment, checkpoint computer 104 can use the AssureTec AssureID driver's license ID-150 built in scanner to examine identification card 500. Using multiple light method that uses visible light 601, near infrared light 602, near ultraviolet light 603, and near ultraviolet light using visible light 604, checkpoint computer 104 can be capable of determining authenticity of identification card 500 such as driver's license and government ID cards presented by the entrant.

Additionally in a scenario wherein the entrant is operating checkpoint computer 104, camera 203 can automatically capture the operator's picture. In one embodiment, checkpoint computer 104 can then be capable of comparing photograph 506 shown on identification card 500 with the operator (the entrant) in front of checkpoint computer 104 and with public record databases 107. This can ensure, that the entrant operating checkpoint computer 104 is using his own identification card 500. Furthermore, required NIST facial recognition match percentage can be set by an authorized personnel such as the Army. As an example, a match in facial features can be required for all three images obtained by checkpoint computer 104.

FIG. 7 illustrates an exemplary method of providing an automated vetting process through AIE environment 103. Initially, checkpoint computer 104 can capture identification data 206 of the entrant through scanning identification card 500, in one embodiment. Checkpoint computer 104 can then send identification data 206 to ACOC server 105. Using a portion or all of the identification data 206 against each public record database 107, ACOC server 105 can then perform a search to find a match on each public record database 107. Once a match is found, ACOC server 105 can receive a record 701 from public record database 107 where the match is found.

In one example, record 701 can be obtained from public record database 107a such as a DMV database. In such example, identification data 206 of the entrant such as driver's license number 501, name 502, date of birth 503, and photograph 506, can be used to produce driver's record of the said entrant. This can determine warrants, and/or traffic violations made by the entrant throughout his driving history. In another example, record 701 can be obtained from public record database 107b such as a state database. In this example identification data 206 of the entrant such as photograph 506 can be used to determine if the state has an interest on said entrant. Further in another example, record 701 can be obtained from public record database 107c such as a federal database. Federal database such as NCIC can utilize identification data 206 that can include but is not limited to name 502, and date of birth 503 to determine if the entrant is listed under a person files, or if the entrant is actively wanted. In one embodiment, name 502 and date of birth 503 must match exactly for search result on record 701 to be returned.

By way of example, the following person files can be available through NCIC searches: (1) Missing Persons File, (2) Foreign Fugitive File, (3) Identity Theft File, (4) Immigration Violator File, (5) Protection Order File, (6) Supervised Release File, (7) Unidentified Persons File, (8) U.S. Secret Service Protective File, (9) Gang File, (10) Known or Appropriately Suspected Terrorist File, (11) Wanted Persons File, (12) National Sex Offender Registry File, (13) National Instant Criminal Background Check File, and (14) Violent Persons File.

Additionally, searches made against NCIC can also be used to acquire an Interstate Identification Index ("NCIC-III") report. Using identification data 206 such as name 502, and date of birth 503, NCIC-III report can provide summary of criminal file numbers from all states, and can retrieve FBI identification numbers for individuals that have Criminal History Record Information ("CHRI"). CHRI can be generated at the time an individual is booked for a crime. Only search results that have exact name 502 and date of birth 503 can be considered as relevant, and are returned as additional information on record 701. For purposes of this disclosure, regardless of final disposition, all relevant criminal charges will be considered when generating a III response. These include nolle prossed, not guilty, non-listed dispositions, and untried cases. As an example, if a Manufacturing Explosive Devices charge appears five years prior the attendants registration, and the district attorney or court forgot to update the disposition of if the individual was acquitted or not tried, it will still generate a criminal history response on record 701, which can require a further review.

Based from record 701 returned from public record databases 107, ACOC server 105 can perform a vetting process to produce an initial adjudication result 702. Initial adjudication result 702 can either be an automated approval 702a or an automated denial 702b. Automated approval 702a can indicate that the entrant is cleared from any criminal history and has passed the minimum requirement needed to enter secured area 102. Furthermore, the entrant granted with automated approval 702a could instantaneously receive initial adjudication result 702 on checkpoint computer 104, which can result to printing of entrant badge 405. Automated denial 702b can indicate that the entrant has an active warrant, and/or has failed to pass the minimum requirement needed to enter secured area 102. In such situation, initial adjudication result 702 may not instantly display on checkpoint computer 104 that the entrant has been denied to the premise. Moreover, automated denial 702b can either result to an arrest-on-site, or may require a further review on entrant's identification and criminal records history, such as 701.

After the automated vetting process the entrant can either be automatically granted permission to enter, automatically denied from entering, or may need to wait until further background review is processed before being granted an access to secured area 102.

Figure 8A:
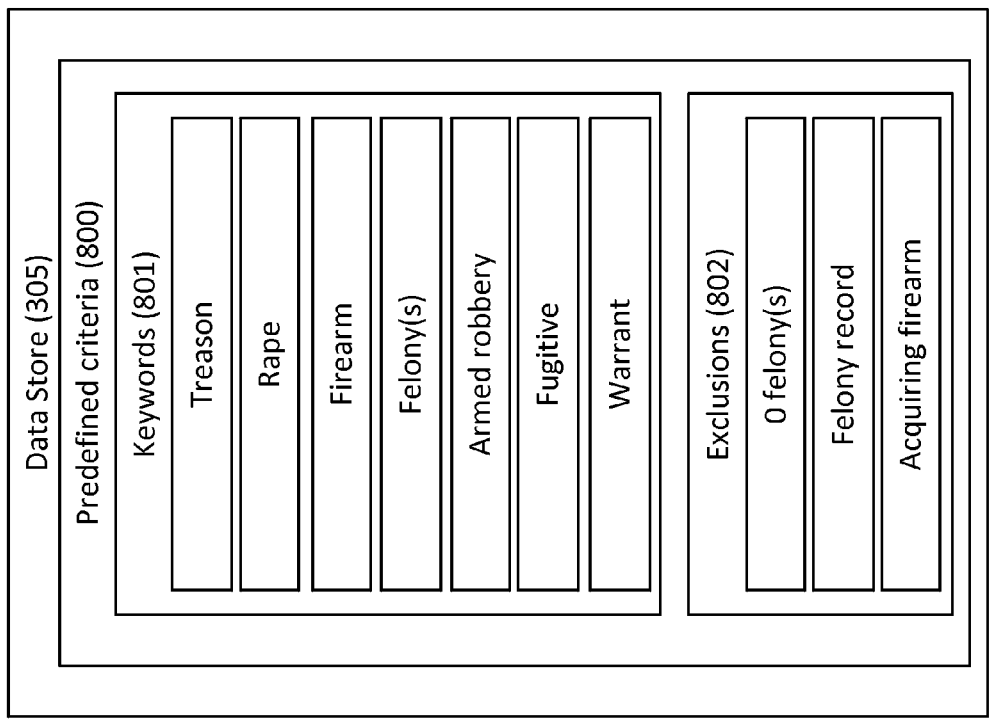
FIG. 8A illustrates a data store comprising predefined criteria.

FIG. 8A illustrates a data store 305 can comprise predefined criteria 800. Predefined criteria 800 can define the standards to be followed in order to come up with initial adjudication result 702. Predefined criteria 800 can comprise one or more keywords 801, and one or more exclusions 802. Keywords 801 can comprise list of predetermined word and/or keyword that is used to indicate a hit. Exclusions 802 can comprise list of predetermined words and/or phrases that is used indicate a non-hit. In one example, wherein checkpoint 101 is at installation 100 of a military facility, predefined criteria 800 can be created based upon a policy that is referred to as Army Directive 2014-05. Army Directive 2014-05 establishes the minimum requirements for individuals to be granted access privileges onto secured area 102. In such embodiment, Army Directive 2014-05 can set the standard of those individuals that should receive automated denial 702b. Thus, predefined criteria 800 can be created such that a hit is generated when a match is related to Army Directive 2014-05 standard, wherein Army Directive 2014-05 sets a standard of those individuals that should be denied access to installation 100. These can include but are not limited to individuals (1) that have a current arrest warrant; or, (2) that have criminal arrest information presenting a potential threat to the good order, discipline, or health and safety; or, (3) that have a criminal history of sexual assault, armed robbery, rape, child molestation, child pornography, trafficking, drug possession, or drug distribution convictions; or, (4) that have a criminal history of espionage, sabotage, treason, terrorism, or murder convictions; or, (5) that are registered sex offenders; or, (6) that have felony convictions within the past 10 years; or, (7) that have felony firearm or explosives convictions; or, (8) that have been engaged in acts or activities designed to overthrow the US Government by force; or, (9) that have identifications that cannot be verified.

As an example, keywords 801 can comprise words such as "treason", "rape", "firearm", "felony(s)", "armed robbery", "fugitive", and/or "warrant", while exclusions 802 can comprise phrases that are known uses of keywords 801, such as "0 felony(s)", "felony record", and "acquiring firearm" that should not be considered a hit in the automated vetting process. For example the term "felony(s)" can be listed under keywords 801 however, the phrase "0 felony(s)" can also be listed under exclusions 802. In such example, whenever ACOC server 105 searches for the word "felony(s)", a match can be found on keywords 801 and would generate a hit but would be a false hit if "felony(s)" was only found within exclusion 802 "0 felony(s)". As another example, whenever ACOC server 105 searches for the word "firearm", a match can be found on keywords 801 and would generate a hit but will be a false hit if "firearm" was only found under exclusions 802 "acquiring firearms".

FIG. 8B illustrates an embodiment of record 701, which was a result from automated vetting process of ACOC server 105. ACOC server 105 can be used to automatically identify individuals and/or entrants that meets and/or does not meet predefined criteria 800. When a word being queried by ACOC server 105 finds a match between records 701 and keywords 801, a hit can be automatically generated unless the queried word also matches exclusions 802.

As such during an automated vetting process for installation 100, ACOC server 105 can query record 701 to find a match under keywords 801 and exclusions 802. As one example, when ACOC server 105 searches for the word "felony record" on record 701, a match cannot be found on keywords 801 but can find a match under exclusions 802 "felony record", as such a false hit can be generated. But once ACOC server 105 queries the word "armed robbery", predefined criteria 800 can be met since "armed robbery" can be found under keywords 801 and is found on records 701 that is shown in FIG. 8B. Moreover, since "armed robbery" does not appear under exclusions 802 a true hit can be generated for record 701 that can result to automated denial 702b.

Figure 9:
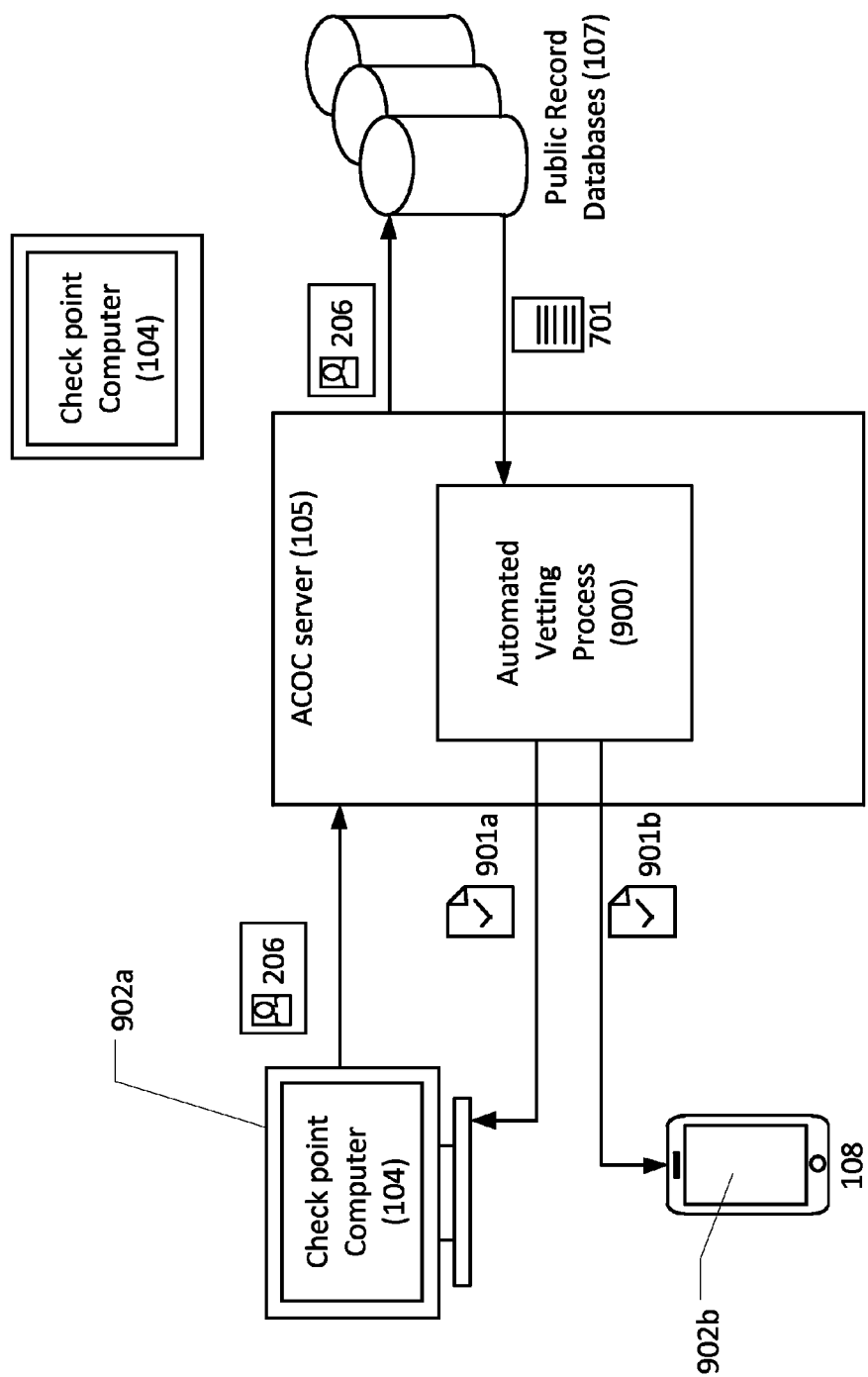
FIG. 9 illustrates an automated vetting process resulting to an automated approval.

FIG. 9 illustrates an automated vetting process 900 resulting to automated approval 702a. Automated vetting process 900 can relate to use of data parsers, and/or algorithms to identify specific individuals. As an example scenario, when the entrant being vetted does not generate a hit during automated vetting process 900, the entrant can be granted an automated approval 702a. In such scenario, ACOC server 105 can send an initial directive 901 to an individual informing the individual of automated approval 702a. Initial directive 901 can be specific instructions directed to the individual such as the entrant, or checkpoint attendant. In one embodiment, ACOC server 105 can send a checkpoint initial directive 901a to checkpoint computer 104. In such embodiment, a checkpoint approval message 902a can be displayed on screen 201 of checkpoint computer 104. In another embodiment, ACOC server 105 can send an entrant initial directive 901b to mobile number 404 of entrant device 108. In such embodiment, an entrant approval message 902b can be displayed on entrant device 108. An example of approval message 902 can be displayed as follows: "Request to access [location/installation] has been reviewed by [authorized personnel]. Request has been approved. Entry to [location/installation] is allowed."

FIG. 10 illustrates an automated vetting process 900 resulting to automated denial 702b. In a scenario wherein the entrant being vetted generates a hit during automated vetting process 900, the entrant can be given an automated denial 702b. Individuals that are vetted for automated denial 702b can fall in two categories, either: (1) the entrant can be actively wanted 1002, or (2) the entrant can be not actively wanted. Actively wanted 1002 can indicate that the entrant has an active warrant and/or is listed under a fugitive list. In one embodiment wherein checkpoint computer 104 can be a kiosk, ACOC server can send directive 901c on checkpoint computer 104. In an embodiment wherein the entrant can be on a mobile device, ACOC server 105 can send directive 901c to mobile number 404 of entrant device 108. In such embodiments, an entrant denial message 1001a can be displayed. In one embodiment, entrant denial message 1001a can be a prerecorded audio message. In another embodiment, entrant denial message 1001a can be a text message. An example of entrant denial message 1001a can be as follow: "Your request may take a few minutes to process. Please wait".

Concurrently, in an embodiment wherein checkpoint computer 104 is a mobile device, ACOC server 105 can send a directive 901d to the attendant through checkpoint computer 104. In such embodiment, a checkpoint denial message 1001b can be displayed on checkpoint computer 104. ACOC server 105 can send directive 901d to notify the attendant that the entrant is actively wanted and a call can be placed to inform authorities such as local law enforcement of the situation. As such, the attendant can have the entrant be arrested on site.

Figure 11A:
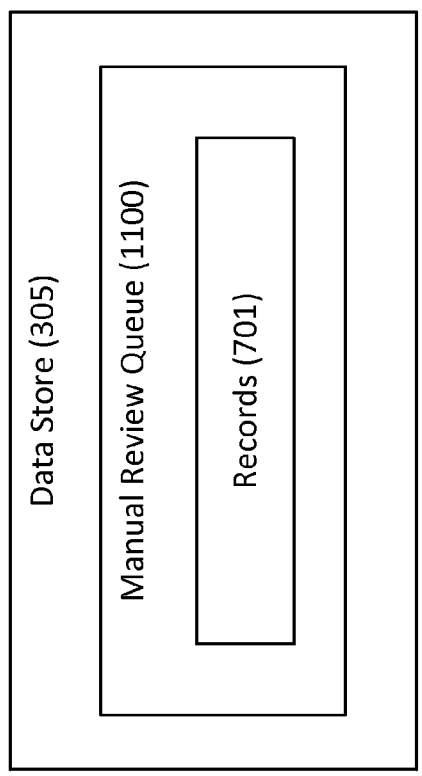
FIG. 11A illustrates an embodiment of a data store comprising a manual review queue.

FIG. 11A illustrates an embodiment of data store 305 comprising a manual review queue 1100. Manual review queue 1100 can comprise one or more records 701. In a scenario wherein initial adjudication result 702 from automated vetting process 900 can be not actively wanted, records 701 for that specific entrant can be stored on manual review queue 1100.

Figure 11B:
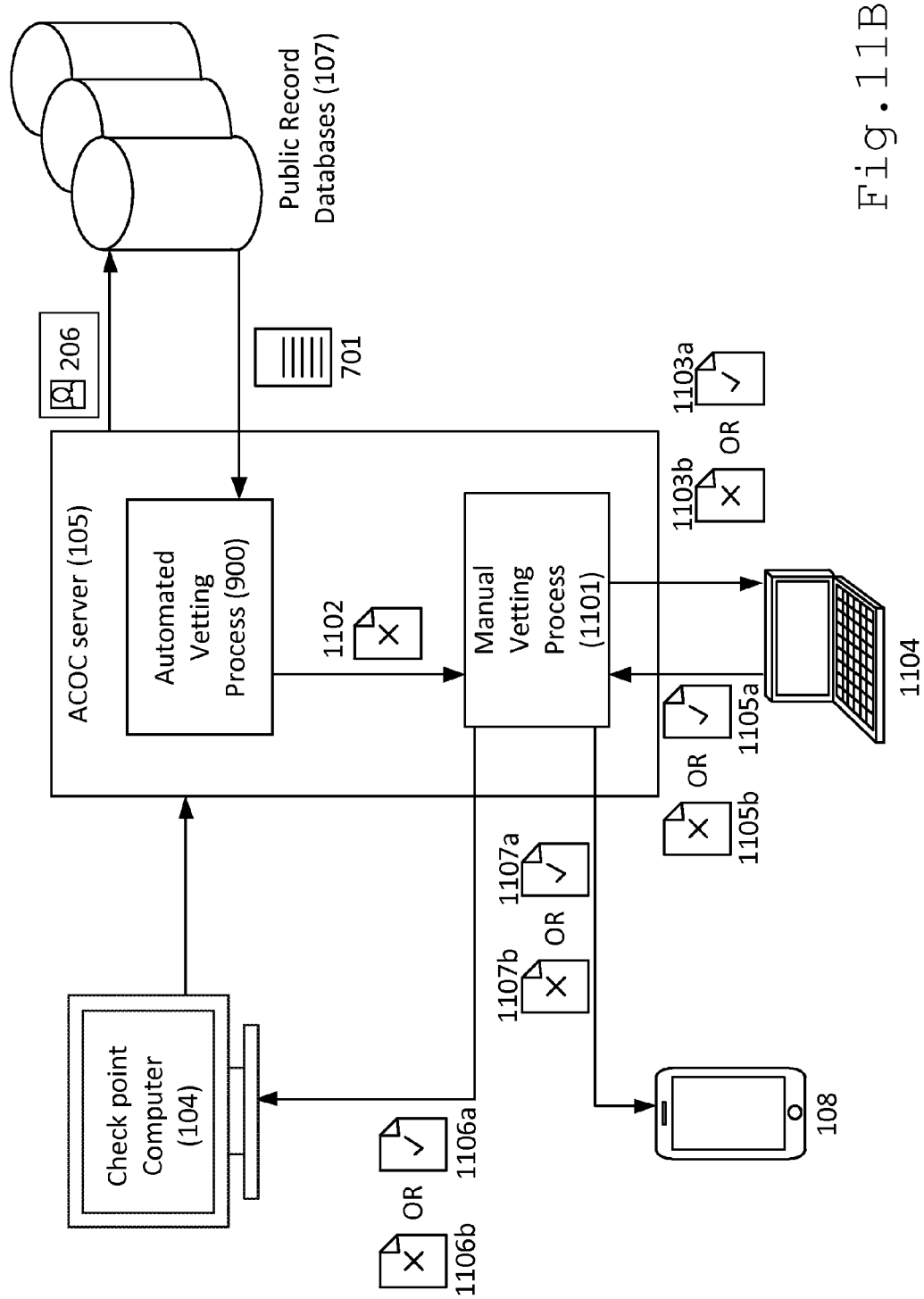
FIG. 11B illustrates an automated vetting process resulting to a manual-vetting process.

FIG. 11B illustrates automated vetting process 900 resulting to a manual-vetting process 1101. In a scenario wherein initial adjudication 702 does not meet predefined criteria 800, manual-vetting process 1101 can take place. Moreover, manual-vetting process 1101 can occur when initial adjudication result 702 for the entrant is a not actively wanted 1102. Not actively wanted 1102 can indicate that the entrant can be a potential threat to the premise such as individuals with felony criminal record. In an embodiment wherein the entrant can be not actively wanted 1102, record 701 from said entrant can be sent on manual review queue 1100. As such, checkpoint attendant can do a manual review 1104 on records 701 stored within manual review queue 1100. In one embodiment, manual-vetting process 1101 can result to a subsequent adjudication 1103, which can either result to a manual approval 1103a or a manual denial 1103b. Manual approval 1103a can indicate that subsequent adjudication result 1103 can be a false hit. As such, records 701 of the entrant can be clear from any criminal history, and/or has passed the minimum requirement needed to enter secured area 102. Furthermore, manual denial 1103b could indicate that adjudication result 1103 can be a true hit. In such scenarios, ACOC server 105 can send a subsequent directive 1105 to checkpoint computer 104 or entrant device 108. Subsequent directive 1105 can be based from subsequent adjudication 1103 during manual review 1104. In one embodiment, subsequent directive 1105 can comprise a checkpoint subsequent directive 1106 and an entrant subsequent directive 1107. Checkpoint subsequent directive 1106 can either result to an approved checkpoint subsequent directive 1106*a* or a denied checkpoint subsequent directive 1106*b*. Furthermore, entrant subsequent directive 1107 can either result to an approved entrant subsequent directive 1107*a* or a denied entrant subsequent directive 1107*b*.

In such embodiments, approved checkpoint subsequent directive 1106*a* and approved entrant subsequent directive 1107*a* can be a result of manual approval 1103*a* that is based from manual review 1104. In one embodiment, approved checkpoint subsequent directive 1106*a* can result in printing of entrant badge 405. In another embodiment, approved entrant subsequent directive 1107*a* can result to notifying the entrant to proceed to checkpoint computer 104 to receive entrant badge 405. Moreover, denied checkpoint subsequent directive 1106*b* and denied entrant subsequent directive 1107*b* can be a result of manual denial 1103*b* that is based from manual review 1104.

FIG. 12 illustrates a review screen 1200 during manual review 1104. The attendant and/or authorized personnel can check the information found on review screen 1200. During manual review 1104, the attendant can check if an identification card photograph 506*a* and checkpoint computer photograph 506*b* are at least matched at a specific percentage. In a preferred embodiment, specific percentage can be at least 85%. Identification card photograph 506*a* can be photograph that was scanned from identification card 500. Checkpoint computer photograph 506*b* can be photograph that was captured from camera 203 of checkpoint computer 104. In a scenario wherein identification card photographs 506*a* and checkpoint computer photographs 506*b* did not match, the attendant can click on deny button 1202. Moreover, the attendant can check record 701 to determine if subsequent adjudication 1103 for the entrant is a true hit, or a false hit. In the example shown in FIG. 12, the adjudication for the entrant is considered a true hit as predefined criteria 800 was met when words "armed robbery" was only found under keywords 801 and was not found under exclusions 802. As such, the attendant at checkpoint 101 can click on deny button 1202 to deny the entrant from accessing the premise. Further in another scenario wherein the adjudication for the entrant is considered false hit, the attendant can click on approve button 901. Further in one embodiment, the attendant can click a call subject button 1204 to inform the entrant of subsequent directive 1106. In another scenario wherein the entrant can be actively wanted, the attendant can click call police button 1203 to report the said entrant. The attendant on checkpoint 101 can provide local law enforcement, such as police, with information about the entrant, including location, and offense information.

Figure 13:
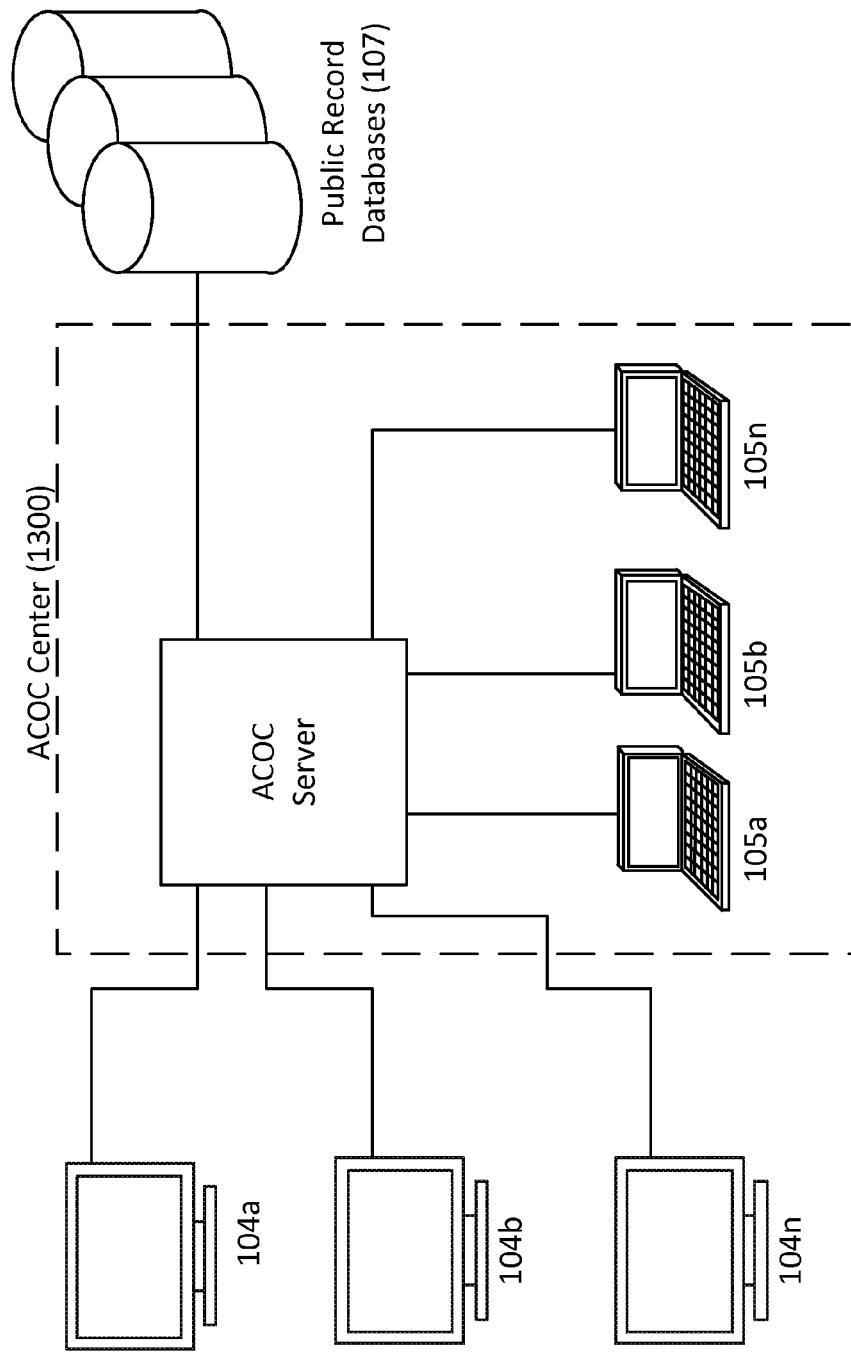
FIG. 13 illustrates a centralized system for ACOC center.

FIG. 13 illustrates a centralized system for ACOC center 1300. ACOC center 1300 can comprise one or more ACOC servers 105. In this embodiment, a plurality of public record database 107 and one or more checkpoint computers 104 can connect to ACOC server 105. In such embodiment, ACOC servers 105 within ACOC center 1300 can share data information stored within ACOC center server data store 305.

Checkpoint memory 208 and server memory 302 can include both volatile and non-volatile memory and data storage components. Volatile components do not retain data values upon loss of power. Non-volatile components, on the other hand, retain data upon a loss of power. Thus, checkpoint memory 208 and server memory 302 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, checkpoint processor 207 and server processor 301 can represent multiple processors. Likewise, checkpoint memory 208 and server memory 302 can represent multiple memories that operate in parallel processing circuits, respectively. In such a case, first local interface 209 and second local interface 303 can be an appropriate network, including network 106 that facilitates communication between any two of the multiple checkpoint processor 207 and server processor 301, between any checkpoint processor 207 and server processor 301 and any of the checkpoint memory 208 and server memory 302, or between any two of the checkpoint memory 208 and server memory 302, etc. First local interface 209 and second local interface 303 can comprise additional systems designed to coordinate this communication, including, but not limited to, performing load balancing. Checkpoint processor 207 and server processor 301 can be of electrical or of some other available construction.

Although checkpoint application 210 and server application 304, and other various systems described herein can be embodied in software or code executed by general purpose hardware discussed above, checkpoint application 210 and server application 304 can also be embodied in dedicated hardware or a combination of software/general purpose hardware and dedicated hardware. If embodied in dedicated hardware, each checkpoint application 210 and server application 304 can be implemented as a circuit or state machine that employs a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIGS. 7, 9, 10, and 11 shows the functionality and operation of an implementation of portions of checkpoint application 210 and server application 304. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as checkpoint processor 207 and server processor 301 in a computer system or other system. The machine code can be converted from the source code, etc. If embodied in hardware, each block can represent a circuit or a number of interconnected circuits to implement the specified logical function(s).

Although the flowchart of FIGS. 7, 9, 10, and 11 show a specific order of execution, the order of execution can differ from what is depicted. For example, the order of execution of two or more blocks can be rearranged relative to the order shown. Also, two or more blocks shown in succession in flowchart of FIGS. 7, 9, 10, and 11 can be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. All such variations are within the scope of the present disclosure.

Also, any logic or application described herein that comprises software or code, including checkpoint application 210 and server application 304, can be embodied in any computer-readable storage medium for use by or in connection with an instruction execution system such as, checkpoint processor 207 and server processor 301 in a computer system or other system. The logic can comprise statements including instructions and declarations that can be fetched from the computer-readable storage medium and executed by the instruction execution system.

In the context of the present disclosure, a "computer-readable storage medium" can be any medium that can contain, store, or maintain the logic or application described herein for use by or in connection with the instruction execution system. The computer-readable storage medium can comprise any one of many physical media, such as electronic, magnetic, optical, electromagnetic, infrared, or semiconductor media. More specific examples of a suitable computer-readable storage medium can include, but are not limited to, magnetic tapes, magnetic floppy diskettes, magnetic hard drives, memory cards, solid-state drives, USB flash drives, or optical discs. Also, the computer-readable storage medium can be a random access memory (RAM), including static random access memory (SRAM), dynamic random access memory (DRAM) or magnetic random access memory (MRAM). In addition, the computer-readable storage medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for determining entry to a secured area at a checkpoint comprising the steps
   receiving by an Access Control Operations Center (ACOC) server from a checkpoint computer a request for entry and identification data, said request for entry and said identification data related to an entrant;
   requesting one or more records from one or more public records databases, said one or more records associated with said identification data, further wherein said one of more public records databases comprises one or more state Department of Motor Vehicle databases;
   receiving by said ACOC server said one or more records from said one or more public record databases, wherein said one or more records comprises a driving record;
   performing a keyword search on said one or more records using one or more predetermined keywords to find hits on said one or more predetermined keywords;
   excluding false hits from said hits, said false hits related to one or more predetermined exclusions;
   sending by said ACOC server to said checkpoint computer a directive to deny said request for entry if any of said hits remain after excluding said false hits; and
   sending by said ACOC server to said entrant device using said mobile number an automated denial message if any of said hits remain after excluding said false hits, further wherein said automated denial message is sent as a prerecorded audio message.

2. The method of claim 1, wherein said identification data consists of a name and a birthday.

3. The method of claim 1, wherein one of said one or more public records databases comprises the National Crime Information Center (NCIC) database.

4. The method of claim 3 wherein said one or more records further comprises a criminal record.

5. The method of claim 1 wherein said ACOC server further receives a mobile number of an entrant device of said entrant.

6. The method of claim 1 wherein said automated denial message is sent as a text message.

7. The method of claim 1 comprising the step of notifying local law enforcement if said entrant is actively wanted.

8. A system for determining entry to a secured area at a checkpoint comprising
   a memory comprising
   a server application, and
   a data storage comprising
      one or more predetermined keywords, and
      one or more predetermined exclusions;
   a processor that, according to said server application
      receives from a checkpoint computer a request for entry and identification data, said request for entry and said identification data related to an entrant;
      requests one or more records from one or more public records databases, said one or more records associated with said identification data, further wherein said one of more public records databases comprises one or more state Department of Motor Vehicle databases;
      receives said one or more records from said one or more public record databases, wherein said one or more records comprises a driving record;
      performs a keyword search on said one or more records using said one or more predetermined keywords to find hits on said one or more predetermined keywords;

excludes false hits from said hits, said false hits related to one or more predetermined exclusions; and sends to said checkpoint computer a directive to deny said request for entry if any of said hits remain after excluding said false hits; and sends by said ACOC server to said entrant device using said mobile number an automated denial message if any of said hits remain after excluding said false hits, further wherein said automated denial message is sent as a prerecorded audio message.

9. The system of claim 8 wherein said checkpoint computer is a kiosk.

10. The system of claim 8 wherein said checkpoint computer is a mobile device.

11. The system of claim 8, wherein said identification data consists of a name and a birthday.

12. The system of claim 8, wherein one of said one or more public records databases further comprises a National Crime Information Center (NCIC) database.

13. The system of claim 8 wherein said one or more records further comprises a criminal record.

14. A non-transient computer readable storage medium having a computer readable program code embodied therein, wherein the computer readable program code is adapted to be executed to implement the method of claim 1.

* * * * *